May 3, 1960
S. W. GATES
2,935,682
TIMING CIRCUIT
Filed Oct. 23, 1956
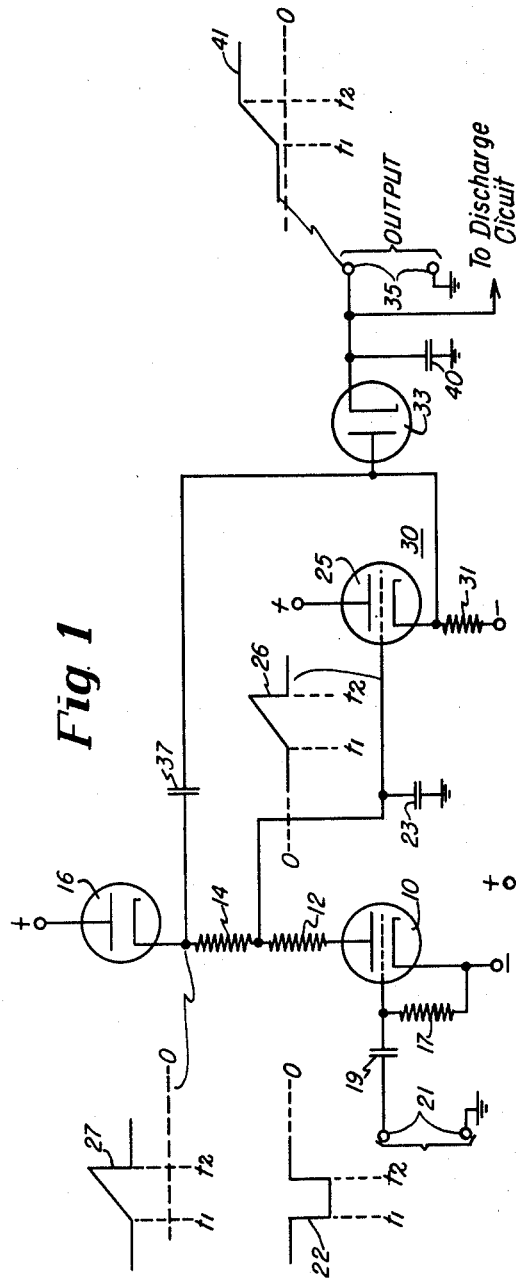
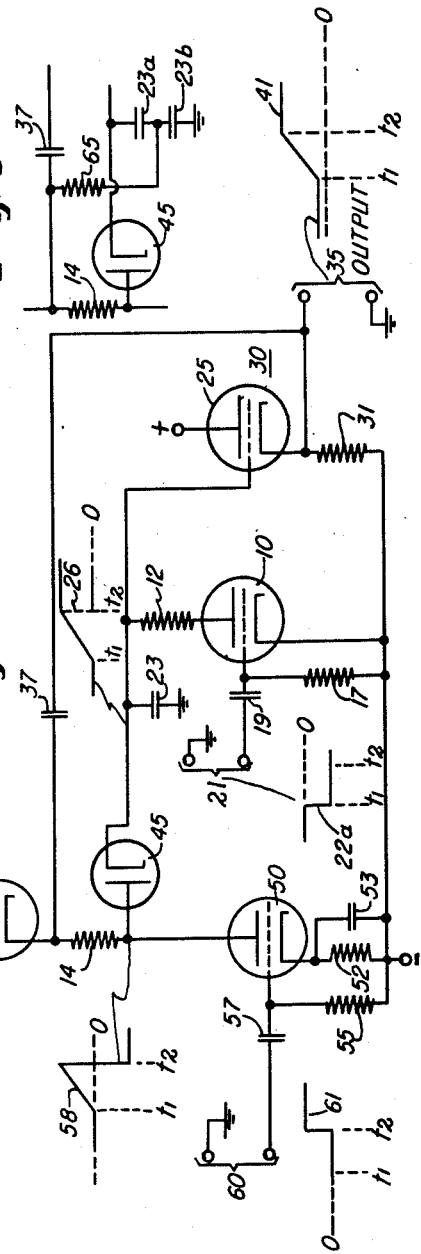
INVENTOR.
Sheldon W. Gates
BY
Mueller and Aichele
Attys.

United States Patent Office 2,935,682
Patented May 3, 1960

2,935,682

TIMING CIRCUIT

Sheldon W. Gates, Phoenix, Ariz., assignor to Motorola, Inc., Chicago, Ill., a corporation of Illinois Application October 23, 1956, Serial No. 617,737

5 Claims. (Cl. 324—68)

This invention relates to electronic timing circuits and more particularly to timing circuits of the type adapted to convert pulse time information into a potential.

There are various instances in which it may be desired to establish a voltage as a function of the time relation among pulses so that the voltage may be sampled to indicate this relation. For example, the demodulating circuit in a communication system using pulse time modulation may utilize a bootstrap sawtooth generator controlled by the pulses and having the output potential of the generator stored in a capacitor for sampling purposes. However, under certain circumstances, a sampling system for a bootstrap sawtooth wave generator may involve an impedance which delays the response time of the system thus delaying the instant at which sampling may occur. Furthermore the correction of this defect by changing the RC time in the storage circuit may prevent the use of relatively long sampling periods because the sampling charge diminishes within a relatively short time after being established by a given pulse.

Some of the systems for pulse sampling have also required a relatively large number of components including circuitry for isolation of the storage system from the sampling system and circuitry for discharging the storage capacitor. In addition, portions of former circuits have introduced a certain amount of non-linearity so that precise recovery of pulse time information was not possible.

Accordingly, it is an object of the present invention to provide an improved and simplified pulse responsive timing circuit utilizing a minimum of component parts.

Another object is to provide a circuit for converting pulse time information into a potential, which circuit provides improved linearity of response to input pulse information.

A further object is to provide a pulse responsive timing circuit which has a reduced output circuit time delay.

Still another object of the invention is to provide a circuit for converting pulse information into a potential which is variable according to the information and wherein the circuit permits using relatively long periods for sampling of the potential.

A feature of the invention is the provision of a keyed bootstrap sweep generator having an isolation circuit with a capacitor in the input thereof and a feedback path which permits charging of the capacitor toward an increasing potential. The circuit further includes an electron valve through which the capacitor is charged, and a cut-off circuit for the valve so that the capacitor may be isolated when the voltage thereon is sampled thus forming a sampling system having improved linearity and minimum output time delay.

Another feature of the invention is the provision of capacitor means in an improved keyed bootstrap sweep generator which may be isolated by a trigger signal so that it retains a charge potential to be sampled and in which system a resistor is coupled to the capacitor means and its charging circuit to balance leakage from the capacitor means thereby preventing reduction of the charge potential during sampling for relatively long periods.

Further objects, features and the attending advantages of the invention will be apparent upon consideration of the following description when taken in conjunction with the accompanying drawing in which:

Fig. 1 is a schematic diagram of a bootstrap sweep generator which converts pulse information into a potential;

Fig. 2 is a schematic diagram of the improved timing circuit of the present invention; and Fig. 3 is a schematic diagram of a modified portion of the circuit of Fig. 2.

The invention provides a timing circuit wherein a capacitor coupled in the input of a power amplifier (or isolation circuit) is charged by a feedback circuit from the output of the amplifier so that it is charged toward an increasing potential. A suitable trigger circuit coupled to the feedback path, and operated by pulse containing information to be derived is used to commence the charging operation. The capacitor is connected to an electron valve in the feedback path to be charged therethrough and a trigger circuit coupled to this valve is adapted to render it non-conductive at the end of each pulse to be sampled thus isolating the capacitor so that its charge potential may be sampled at the output of the amplifier. To compensate for leakage losses on the capacitor during sampling, the capacitor may consist of two sections which are connected to a resistor fed by the charging circuit of the capacitor sections when this path is otherwise broken by the afore-mentioned electron valve. The RC network thus formed is selected to compensate for leakage from the capacitor sections so that the sampling voltage does not diminish.

Considering now the drawing, a description will be given of the circuit of Fig. 1 which is adaped to translate pulse time separation into a potential for any desired purpose. Triode valve 10, resistor 12, resistor 14 and diode valve 16 are connected in series between the negative terminal of a direct current power supply and the positive terminal thereof. In the normal condition valves 10 and 16 conduct. A D.C. return for grid to cathode of valve 10 is furnished by resistor 17 and an input path to this grid is provided by means of blocking capacitor 19. An initiating pulse 22, negative with respect to ground, ground potential being intermediate the positive and negative potentials, is applied across input terminals 21, one of which is connected to blocking capacitor 19 and the other of which is grounded. This pulse serves to cut off valve 10.

In the normally conductive condition of elements 10, 12, 14 and 16, capacitor 23, connected from the junction of resistors 12 and 14 to ground, maintains the grid of triode valve 25 at ground potential or slightly below. However, with valve 10 cut off, capacitor 23 tends to charge through resistor 14 and diode 16. Valve 25 is connected in a cathode follower circuit 30 which includes a load resistor 31 connected between the negative potential and the cathode of valve 25. The positive potential is applied to the anode of valve 25. The output is taken across terminals 35, one of which is grounded and the other of which is coupled through diode 33, cathode to anode, to the cathode of valve 25. The cathode of valve 25 is coupled through capacitor 37 to the junction of resistor 14 and the cathode of diode 16. Accordingly, as valve 10 is cut off and capacitor 23 begins to charge, the potential at the grid of valve 25, waveform 26, rises tending to increase conduction of this valve and to apply a rising potential, waveform 27, to the cathode of valve 16, which is then cut off. Thus, capacitor 23 continues to charge through the feedback path in the cathode follower and does so linearly because the potential at the top of resistor 14 is rising by an amount equal to the instantaneous charge on the capacitor. This action would continue until the cathode follower output is unable to reproduce its input or until the gating pulse 22 collapses.

For the usual operation of the circuit, it is contemplated that the components be selected so that the cessation of the initiating pulse will occur during the linear charging rate.

In order to sample a voltage proportional to the time between the initiation and the collapse of the pulse, that is, the time between $T_1$ and $T_2$, a capacitor 40 is coupled across the output terminals 35 and this capacitor will attain a charge equal to the ramp height at the time when the initiating pulse ceases. Thus, at time $T_2$ valve 10 will discharge capacitor 23 and the current flow through valve 25 will no longer be increasing so that valve 33 is cut off to isolate capacitor 40. The potential 41 at output terminals 35 may then be sampled after which a discharge circuit may be completed across capacitor 40 to discharge this capacitor and prepare the system for the next initiating pulse.

In the circuit of Fig. 1 difficulty may be experienced in obtaining satisfactory results during sampling of the potential on capacitor 40. For example, the rise time of capacitor 40 in charging through the internal impedance of cathode follower 30 can delay the instant at which sampling may begin. This would dictate the use of a comparatively small value for capacitor 40 which would increase the rate of discharge, or tendency for leakage, through other portions of this circuit. Furthermore circuits providing a high leakage resistance for capacitor 40 could be very difficult to construct since leakage resistances of the order of hundreds of megohms could be involved. It can also be seen that in this type of a timing circuit, valve 33 could introduce a certain amount of non-linearity and additional circuitry for discharging capacitor 40 after sampling could unduly complicate the system and require extra components. It may further be pointed out that in a practical system an isolating stage would also be required for capacitor 40 to prevent loading thereof during sampling.

The circuit of Fig. 2 overcomes difficulties such as those outlined above. In this figure components corresponding generally to those of Fig. 1 are given the same reference numerals. In the normal condition of this apparatus valves 10 and 16 are conductive through resistors 12 and 14 between which resistors a diode valve 45 is inserted with its anode coupled to resistor 14. Operation is initiated by applying negative pulse 22a at time $T_1$ to input terminals 21 and this cuts off valve 10 permitting capacitor 23 to charge according to waveform 26 through the feedback path from the cathode of valve 25 through capacitor 37, resistor 14, and diode 45.

At time $T_2$ however, when the apparatus is to be triggered off for sampling, a positive pulse 61 is applied to the grid of triode valve 50. The anode of this valve is connected to the junction of resistor 14 and the anode of valve 45 and its cathode is connected through a cathode bias resistor 52 to the negative potential. Capacitor 53 bypasses this resistor at signal frequencies. A D.C. return for the control grid of valve 50 is provided by resistor 55 and an input capacitor 57 couples the control grid to one of a pair of input terminals 60, the other of which is grounded. The components including resistor 52 are chosen so that valve 50 is for all practical purposes cut off in the normal state. However, as stopping pulse 61 is applied to the grid of valve 50, valve 50 is made heavily conductive to cut off valve 45 (waveform 58) thus breaking the charging path for capacitor 23, capacitor 23 then holds its charge as long as valve 10 remains cut off and valve 50 is conductive. Accordingly, the output will be held at a constant level according to the potential established at the grid of valve 25 by the charge on capacitor 23 and this output may be sampled after which pulses 22a and 61 are collapsed to prepare the apparatus for reception of the next pulse.

It may be noted that the circuit of Fig. 2 does not require a capacitor in the output circuit, and that the capacitor, the voltage of which is to be sampled, is isolated from the output circuit by the cathode follower 30. Furthermore, any non-linearity caused by valve 33 is obviated and no separate discharge circuit is required for preparing the apparatus for reception of the next initiating pulse. It can also be seen that sampling may occur at the instant the charging ramp stops rising as there would be virtually no output circuit time delay.

To further improve the operation of the circuit of Fig. 2, and particularly when the sampling period would be relatively long, the modification shown in Fig. 3 may be made to prevent leakage from capacitor 23 through valve 30 and any slight sag in the output of the apparatus. At time $T_2$ when the stopping pulse 61 is applied to valve 50 (Fig. 2) capacitors 23a and 23b cease charging through resistor 14 and capacitor 23b may continue to charge slowly through resistor 65. The RC time of resistor 65 and capacitor 23b is chosen so that the voltage across capacitor 23b will rise at a rate equal to the rate of discharge of capacitors 23a and 23b through any leakage in the system. Thus, the tendency for sagging of the output is compensated and a constant output voltage may be maintained during the sampling period.

Accordingly this invention provides a relatively simple pulse responsive timing circuit using a minimum of component parts and providing a very linear response in the output. This system would find utility when precise response is necessary in a system and in which output sampling may be required immediately after the stopping pulse has occured and where the sampling current may be relatively long during which time the output potential should not diminish in value.

I claim:

1. A timing circuit for producing a potential proportional to the time between first and second pulses including in combination capacitor means, an electron valve, circuit means coupled to said electron valve and said capacitor means and responsive to the first pulse for charging said capacitor means in a substantially linear manner through said electron valve toward a voltage rising according to the instantaneous charge on said capacitor means, said circuit means including output means providing a potential proportional to the charge on said capacitor means, means responsive to the second pulse to render said electron valve non-conductive, said circuit means providing a path for a certain leakage current from said capacitor means when said electron valve is non-conductive, and resistor means coupled to said capacitor means and said circuit means, the value of said resistor means being selected to provide current from said circuit means to compensate for said certain leakage current, whereby said capacitor means retains its charge so that said potential is available at said output means.

2. A bootstrap timing circuit including in combination, a first electron valve adapted to be connected to the negative terminal of a direct current source and to be rendered non-conductive by a first trigger signal, a second electron valve adapted to be coupled to the positive terminal of the source, a third electron valve, resistor means intercoupling said first and second electron valves in a normally conductive direct current path through said third electron valve, a cathode follower having an input and an output, said third electron valve having an input element coupled to said input of said cathode follower and an output element coupled to a point of said resistor means, first capacitor means coupling the output of said cathode follower to a point of said resistor means positive with respect to said first-mentioned point thereof to provide a feedback path for said cathode follower, second capacitor means coupled from said input of said cathode follower to a potential intermediate that of the direct current source so that upon cut-off of said first electron valve said second capacitor means is charged by said cathode follower through said feedback path, and a fourth electron valve coupled to said output element of said third electron valve for rendering the same non-conductive in response to a second trigger signal whereby said second capacitor means may retain a charge thereon for sampling at said output of said cathode follower a potential proportional to the time between the first and second trigger signals.

3. A bootstrap timing circuit including in combination, a first electron valve adapted to be connected to the negative terminal of a direct current source and to be rendered non-conductive by a first trigger signal, a second electron valve adapted to be coupled to the positive terminal of the source, a third electron valve, resistor means intercoupling said first and second electron valves in a normally conductive direct current path through said third electron valve, a cathode follower having an input and an output, said third electron valve having an input element coupled to said input of said cathode follower and an output element coupled to a point of said resistor means, first capacitor means coupling the output of said cathode follower to a point of said resistor means positive with respect to said first-mentioned point thereof to provide a feedback path for said cathode follower, second and third capacitor means series coupled from said input of said cathode follower to a potential intermediate that of the direct current source so that upon cut-off of said first electron valve said second and third capacitor means are charged by said cathode follower through said feedback path, a fourth electron valve coupled to said output element of said third electron valve for rendering the same non-conductive in response to a second trigger signal, resistor means coupled between said first capacitor means and said second and third capacitor means, said resistor means having a valve to conduct current to said second and third capacitor means at a rate to compensate for leakage current therefrom when said third electron valve is non-conductive, whereby said second and third capacitor means may retain a uniform charge thereon for sampling purposes at said ouput of said cathode follower.

4. A bootstrap timing circuit for charging a capacitor during an interval between first and second signals, said circuit including in combination, a direct current conducting circuit including a first electron valve, a load impedance for said first electron valve, a second electron valve, a further resistor and a third electron valve all series connected to a potential source in the order named; a further electron valve having a control electrode coupled to said second electron valve and output electrodes connected to potential supply means; a feedback capacitor coupled from said output electrode to said further resistor, further capacitor means coupled to said control electrode and to the potential supply means; means for cutting off said first electron valve in response to the first signal whereby said further capacitor means charges and said further electron valve and said feedback capacitor supply charging energy through said further resistor; and means for cutting off said second electron valve in response to the second signal whereby a potential representing the charge on said further capacitor means is available at an output electrode of said further electron valve.

5. A bootstrap timing circuit including in combination, an amplifier circuit including a first electron valve having input and output electrodes and a positive feedback circuit connected between said electrodes, a capacitor coupled to said input electrode to form a charging path together with said feedback circuit so that said capacitor may charge through said feedback path toward a potential rising according to the output of said amplifier circuit, a second electron valve series coupled in the charging path of said capacitor so that said capacitor is charged therethrough, first control circuit means coupled to said capacitor and responsive to a starting pulse to cause said capacitor to charge through the charging path and said second electron valve, and second control circuit means connected to said second electron valve and responsive to a stopping pulse for cutting off said second electron valve, whereby a potential proportional to the charge on said capacitor is available at said output electrode of said first electron valve to represent a measure of the time between the starting and stopping pulses.

aabutcbe

References Cited in the file of this patent

UNITED STATES PATENTS

| 2,377,757 | Clark | June 5, 1945 |
| 2,494,352 | Moyer | Jan. 10, 1950 |
| 2,511,868 | Newsom | June 20, 1950 |
| 2,688,075 | Palmer | Aug. 31, 1954 |

FOREIGN PATENTS

| 922,156 | Germany | Jan. 10, 1955 |